US009325496B2

(12) United States Patent
Oshida et al.

(10) Patent No.: US 9,325,496 B2
(45) Date of Patent: Apr. 26, 2016

(54) ENCRYPTION KEY PROVIDING METHOD, SEMICONDUCTOR INTEGRATED CIRCUIT, AND ENCRYPTION KEY MANAGEMENT DEVICE

(71) Applicant: Renesas Electronics Corporation, Kanagawa (JP)

(72) Inventors: Daisuke Oshida, Kanagawa (JP); Tetsuya Fukunaga, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 30 days.

(21) Appl. No.: 14/493,702

(22) Filed: Sep. 23, 2014

(65) Prior Publication Data

US 2015/0086016 A1 Mar. 26, 2015

(30) Foreign Application Priority Data

Sep. 24, 2013 (JP) ................................ 2013-196532

(51) Int. Cl.
*H04L 9/08* (2006.01)
*H04L 9/32* (2006.01)

(52) U.S. Cl.
CPC ............ *H04L 9/0866* (2013.01); *H04L 9/0822* (2013.01); *H04L 9/3239* (2013.01); *H04L 2209/84* (2013.01)

(58) Field of Classification Search
None
See application file for complete search history.

(56) References Cited

U.S. PATENT DOCUMENTS

| | | | | |
|---|---|---|---|---|
| 7,139,918 B2* | 11/2006 | Chang | ................. | H04L 63/0428 380/277 |
| 2001/0036275 A1* | 11/2001 | Murakami | ............ | H04L 9/0847 380/277 |
| 2004/0105545 A1* | 6/2004 | Khandelwal | ........... | H04N 7/163 380/232 |
| 2011/0150217 A1* | 6/2011 | Kim | ............... | H04N 21/234327 380/210 |
| 2012/0324241 A1* | 12/2012 | Oshida | .................... | G06F 21/73 713/189 |
| 2012/0324310 A1 | 12/2012 | Oshida et al. | | |
| 2015/0131795 A1* | 5/2015 | Anshel | .................. | H04L 9/3239 380/28 |
| 2015/0207629 A1* | 7/2015 | Oshida | .................. | H04L 9/3278 380/28 |

* cited by examiner

*Primary Examiner* — Michael R Vaughan
(74) *Attorney, Agent, or Firm* — Womble Carlyle

(57) ABSTRACT

The first device, which utilize a cipher, generates device unique data by a PUF, and the second device generates one pair of helper data and a device unique ID on the basis of the generated device unique data. The device unique data has fluctuations caused by the generation environment, and regarding the fluctuations as an error to the device unique ID, the helper data serves as correction data for correcting the error. The second device generates a Hash function from the device unique ID and the encryption key. The second device writes one of the helper data and the Hash function to the first device first, and after authenticating the first device by the write, the other of the helper data and the Hash function is written in the first device. Decrypting the encryption key, the first device is allowed to utilize the cipher.

18 Claims, 9 Drawing Sheets

ENCRYPTION KEY PROVIDING METHOD, SEMICONDUCTOR INTEGRATED CIRCUIT, AND ENCRYPTION KEY MANAGEMENT DEVICE

CROSS-REFERENCE TO RELATED APPLICATIONS

The disclosure of Japanese Patent Application No. 2013-196532 filed on Sep. 24, 2013 including the specification, drawings and abstract is incorporated herein by reference in its entirety.

BACKGROUND

The present invention relates to an encryption key providing method, a semiconductor integrated circuit, and an encryption key management device. In particular, the present invention can be utilized suitably for an encryption key providing method, a semiconductor integrated circuit, and an encryption key management device which have resistance properties against unjust acquisition of an encryption key generated by use of physically unclonable device unique data.

In recent years, there have been reports on cases of various attacks to an electrical unit (Electronic Control Unit: ECU) mounted in a vehicle, such as unjust access and an unjust imitation. In the related art technology of an in-vehicle microcomputer, a key itself for encryption and decryption was written without taking measures against electronic eavesdropping; accordingly, it was easy to steal the encryption key. It is obvious that such unjust acts cause a serious problem from the viewpoint of safety. There has been an increasing need for an in-vehicle microcomputer which has high security against such unjust acts. On the other hand, faults and defects in an in-vehicle microcomputer will affect a human life. Therefore, the analysis of faults and defects is essential. If the tamper-resistant technology is employed all over the microcomputer in order to prevent the unjust acts, the microcomputer will be provided with a high security, and it becomes possible to prevent the unjust acts. On the other hand, it becomes difficult for an automaker, an ECU maker, and a chip maker to conduct the analysis of faults and defects, causing inconvenience for them.

Therefore, the security technology which utilizes an identification code unique to a device (or a device unique ID) generated with the use of a physically unclonable function (PUF) has been examined. In the technology utilizing the PUF, a Hash function which is encrypted by means of the device unique ID (Identification) is written in a region of ROM (Read Only Memory), for example, and data is decrypted with the use of the Hash function decrypted by means of the device unique ID. Therefore, the security is secured.

The physically unclonable function (PUF) is derived from an initial value at the time of power-on of SRAM (Static Random Access Memory), for example. The initial value of SRAM fluctuates due to manufacturing variations; therefore, by taking a sufficiently large number of bits, it can serve as a unique value for each device. On the other hand, there are demands of repeatability that the device unique ID generated from the same device shall have the same value, even if it is generated many times. This is because there is a possibility that it may be taken for a counterfeit product, if a different device unique ID is generated from the same device by nature. However, the initial value of SRAM and many PUFs may have fluctuations depending on the environment in which they are generated, that is, the difference of the ambient temperature in which the device is placed, the power supply voltage, etc.

Patent Literature 1 discloses a semiconductor device capable of generating an initial unique code which is a value unique to a device and includes a random bit error. This semiconductor device corrects the error included in the initial unique code, generates a fixed device unique ID (device unique ID), and utilizes it for the decryption of confidential information. In the error correction, the correction data corresponding to the fixed device unique ID are referred to.
(Patent Literature)
(Patent Literature 1) Japanese Unexamined Patent Application Publication No. 2013-003431

SUMMARY

The examination performed by the present inventors on Patent Literature 1 has revealed that there exists the following new issue.

To a device incorporating a semiconductor device which can generate a device unique ID with the use of a PUF, an encryption key corresponding to the device unique ID is written from an external device (encryption key management device) such as an externally coupled server; thereby it is possible to build a ciphering system which utilizes the encryption key and to protect the device from various attacks, such as unjust access to the device and unjust imitation. For example, when applying to the encryption communications among ECUs mounted in a vehicle, an external device (for example, server) encrypts the key information to be kept secret by utilizing the device unique ID generated with the use of a PUF, generates a Hash function, and stores the Hash function in the ECU, specifically, in an MCU (Micro Controller Unit) implemented in the ECU. The Hash function is not written in at the time of shipment of the MCU, however, it may be written in after performing an assembly of the ECU or the vehicle, or it may be written in when the vehicle is fixed in a repair shop, etc. It turned out that there is a possibility that the injustice which deceives the encryption key management device may be performed at this time.

In such a system, when a prescribed Hash function is correctly written in the MCU, the MCU is regarded as a nondefective item, and when the Hash function is written in failure, the MCU is regarded as a defective item. The defective MCU is excluded from the payment target of the price. It is possible to consider a system in which contents encrypted with the use of a Hash function are acquired by download, etc., and allowed to be utilized only after the prescribed Hash function is written in correctly. Since it is charged only after the Hash function is written in correctly, if there is a malicious user, there is a possibility that the injustice of escaping the payment and enabling the utilization of the contents is performed, by reporting the false write-in failure to an encryption key management device, in spite of having written the Hash function correctly. In this way, it turned out that there exist the security defects in which unjust acquisition of an encryption key is allowed.

Solutions to such problems will be explained in the following. The other issues and new features of the present invention will become clear from the description of the present specification and the accompanying drawings.

According to one embodiment, the solutions are as follows.

That is, it is a method for providing an encryption key to a first device utilizing a cipher from a second device managing the encryption key for the cipher, and is configured as follows. The first device generates device unique data defined uniquely by manufacturing variations, and the second device generates one pair of helper data and a device unique ID on the basis of the device unique data generated by the first device. Here, the device unique data has fluctuations caused by the generation environment, and regarding the fluctuations as an error to the device unique ID, the helper data serves as correction data for correcting the error. The fluctuations generated in the device unique data is absorbed by use of the corresponding helper data, and the device unique ID becomes a code which is free from an error (fluctuations) and defined individually unique to the first device. The second device generates a Hash function from the device unique ID and the encryption key. Both the helper data and the Hash function are written to the first device from the second device, and the first device decrypts the encryption key, enabling the utilization of the cipher. The second device writes first one of the helper data and the Hash function to the first device. After confirming that the writing has been performed normally, the second device writes the other to the first device.

The following explains briefly an effect obtained by the one embodiment.

That is, before enabling the utilization of the encryption key in the first device, it is possible to perform authentication with the use of the device unique ID which is defined individually unique to the first device by manufacturing variations; accordingly, it is possible to prevent unjust acquisition of the encryption key.

DETAILED DESCRIPTION

1. Outline of Embodiments

Figure 1:
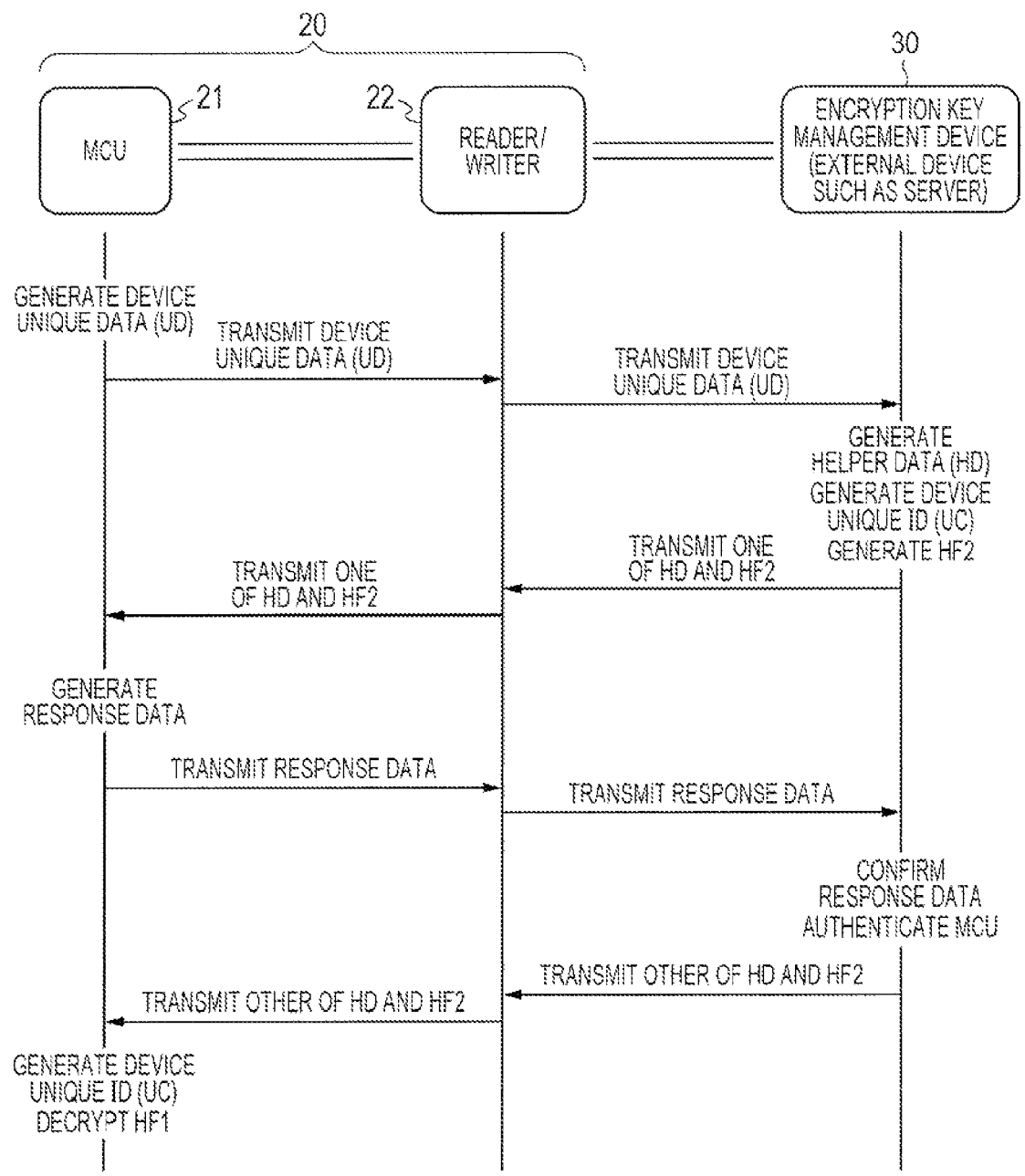
FIG. 1 is a sequence diagram illustrating an encryption key providing method according to Embodiment 1.

First, an outline of a typical embodiment of the invention disclosed in the present application is explained. A numerical symbol of the drawing referred to in parentheses in the outline explanation about the typical embodiment only illustrates what is included in the concept of the component to which the numerical symbol is attached.

(1) <After Authentication by One of Helper Data and a Hash Function, the Other is Provided>

An encryption key providing method for providing an encryption key (HF1) to a first device (20, 21) which utilizes a cipher from a second device (30) which manages the encryption key for the cipher, is configured as follows.

The first device generates device unique data (UD) defined uniquely by manufacturing variations.

The second device generates one pair of helper data (HD) and a device unique ID (UC) based on the device unique data (UD). The device unique ID (UC) is a code defined individually unique to the first device, absorbing the generation environment-caused fluctuations of the device unique data (UD) by use of the corresponding helper data (HD). It is possible to generate plural sets of the helper data (HD1, HD2) and the device unique ID (UC1, UC2) from one device unique data (UD).

The second device generates a Hash function (HF2) from the device unique ID and the encryption key.

The first device decrypts the encryption key based on the Hash function and the device unique ID.

The encryption key providing method includes the following steps:

a first step at which the first device generates device unique data (UD) and provides it to the second device;

a second step at which the second device generates one pair of helper data (HD) and a device unique ID (UC) defined uniquely to the first device, on the basis of the provided device unique data;

a third step at which the second device generates a Hash function (HF2) from the generated device unique ID and the encryption key;

a fourth step at which one of the helper data and the Hash function is transmitted from the second device to the first device;

a fifth step at which the first device transmits response data to the second device based on the one of the helper data and the Hash function received at the fourth step;

a sixth step at which the second device authenticates the first device by confirming the validity of the response data received at the fifth step;

a seventh step at which the second device transmits the other of the helper data and the Hash function to the first device after authenticating the first device at the sixth step; and an eighth step at which the first device decrypts the encryption key, based on the device unique data generated by itself and the helper data and the Hash function received at the fourth step or the sixth step.

With the above-described procedure, before enabling the utilization of the encryption key (HF1) in the first device (20, 21), it is possible to perform authentication with the use of the device unique ID (UC) which is defined individually unique to the first device by manufacturing variations; accordingly, it is possible to prevent unjust acquisition of the encryption key.

(2) <Authentication by the Helper Data>

The encryption key providing method according to Paragraph 1 is configured as follows in particular.

At the fourth step, the second device transmits the helper data to the first device.

At the fifth step, the first device reproduces the device unique ID (UC) from the received helper data, creates the response data based on the reproduced device unique ID, and transmits the response data to the second device.

At the sixth step, the second device confirms the validity of the response data, by comparing the response data with the expectation value data based on the device unique ID (UC) generated at the second step.

At the seventh step, the second device transmits the Hash function (HF2) to the first device, after authenticating the first device at the sixth step.

With the above-described procedure, it is possible to transmit the Hash function as the encryption key information after the authentication (that is, after it is confirmed that the communication path has been established normally), accordingly, it is possible to prevent unjust acquisition of the encryption key.

(3) <Two Sets of the Device Unique ID and the Helper Data>

The encryption key providing method according to Paragraph 2 is configured as follows in particular.

At the second step, on the basis of the provided device unique data, the second device generates a first device unique ID (UC1) defined uniquely to the first device and first helper data (HD1) for generating the first device unique ID. On the basis of the provided device unique data, the second device generates a second device unique ID (UC2) different from the first device unique ID and second helper data (HD2) for generating the second device unique ID.

At the third step, the second device generates a Hash function (HF2) from the second device unique ID and the encryption key.

At the fourth step, the second device transmits the first helper data to the first device.

At the fifth step, the first device reproduces the first device unique ID (UC1) from the received first helper data, creates the response data based on the reproduced first device unique ID, and transmits the response data to the second device.

At the sixth step, the second device confirms the validity of the response data, by comparing the response data with the expectation value data based on the first device unique ID (UC1) generated at the second step.

At the seventh step, the second device transmits further the second helper data to the first device, after authenticating the first device at the sixth step.

At the eighth step, the first device generates the second device unique ID (UC2) based on the device unique data (UD) generated by itself, and the second helper data received at the seventh step, and decrypts the encryption key (HF1) on the basis of the reproduced second device unique ID and the Hash function received at the seventh step.

With the above-described procedure, it is possible to set mutually different values to the device unique ID (UC1) for the authentication and the device unique ID (UC2) for the protection of the encryption key; accordingly it is possible to improve the safety.

(4) <Making a Digest of Response>

The encryption key providing method according to Paragraph 3 is configured as follows in particular.

At the fifth step, the first device creates a digest (H(UC1)) of the reproduced first device unique ID as the response data, with the use of another Hash function different from the Hash function.

At the sixth step, the second device creates a digest (H(UC1)) of the first device unique ID generated at the second step as the expectation value data, with the use of the same Hash function as the another Hash function, and confirms the validity of the response data by comparing the response data with the expectation value data.

With the above-described procedure, it is possible to protect the device unique ID (UC1) transferred at the time of the authentication; accordingly it is possible to improve the safety further.

(5) <An Encryption Key Encrypted by HF2=Helper Data 2+UC2>

The encryption key providing method according to Paragraph 3 is configured as follows in particular.

At the seventh step, the second device combines and scrambles the Hash function and the second helper data, and transmits the scrambled data to the first device.

At the eighth step, the first device decrypts the Hash function and the second helper data by descrambling the scrambled data.

With the above-described procedure, it is possible to protect the Hash function (HF2) and the helper data (HD2) which are transferred at the time of writing the key information; accordingly it is possible to improve the safety further.

(6) <Authentication by the Hash Function>

The encryption key providing method according to Paragraph 1 is configured as follows in particular.

At the fourth step, the second device transmits the Hash function (HF2) to the first device.

At the fifth step, the first device creates the response data based on the received Hash function, and transmits the response data to the second device.

At the sixth step, the second device confirms the validity of the response data, by comparing the response data with the expectation value data based on the Hash function generated at the third step.

At the seventh step, the second device transmits the helper data (HD) to the first device, after authenticating the first device at the sixth step.

With the above-described procedure, it is possible to transmit the helper data (HD) for generating the device unique ID (UC) after the authentication (that is, after it is confirmed that the communication path has been established normally); accordingly, it is possible to prevent unjust acquisition of the encryption key.

(7) <LSI Provided with a PUF Generation Circuit (Authentication by the Helper Data)>

A semiconductor integrated circuit (21) is configured with a unique data generation unit (1) for generating device unique data defined uniquely by manufacturing variations and an encryption key decrypting unit (6) for decrypting an encryption key by use of encryption key information generated by an external device based on the device unique data and supplied from the external device. The semiconductor integrated circuit is configured as follows.

The semiconductor integrated circuit generates device unique data (UC) by means of the unique data generation unit and provides the device unique data to the external device.

The external device receives the device unique data from the semiconductor integrated circuit, and generates helper data (HD) and a device unique ID (UC) on the basis of the received device unique data. The device unique ID (UC) is a code defined individually unique to the semiconductor integrated circuit, absorbing the generation environment-caused fluctuations of the device unique data (UD) by use of the corresponding helper data (HD). The external device transmits the helper data to the semiconductor integrated circuit.

The semiconductor integrated circuit receives the helper data, generates a corresponding device unique ID (UC) on the basis of the received helper data and the device unique data (2), generates response data (H(UC)) on the basis of the generated device unique ID (4_1), and transmits the response data to the external device.

The external device receives the response data, and compares the received response data with the expectation value data (H(UC)) generated on the basis of the device unique ID generated by itself (4_2, 5).

When the comparison result is in agreement, the external device generates a Hash function (HF2) from the device unique ID and the encryption key (7) and transmits the Hash function to the semiconductor integrated circuit.

The semiconductor integrated circuit receives the Hash function and decrypts the encryption key on the basis of the device unique ID generated by itself and the received Hash function (6).

According to the above-described configuration, before enabling the utilization of the encryption key in the semiconductor integrated circuit (21), it is possible to perform authentication with the use of the device unique ID (UC) which is defined individually unique to the semiconductor integrated circuit by manufacturing variations; accordingly, it is possible to prevent unjust acquisition of the encryption key.

(8) <Two Sets of a Device Unique ID and Helper Data>

The semiconductor integrated circuit according to Paragraph 7 is configured as follows in particular.

The external device generates a first and a second helper data (HD1, HD2) and a first and a second device unique ID (UC1, UC2), on the basis of the received device unique data (3), and the external device transmits the first helper data to the semiconductor integrated circuit.

The semiconductor integrated circuit receives the first helper data, generates a corresponding first device unique ID (UC1) on the basis of the received first helper data (HD1) and the device unique data (2_1), generates response data (H(UC1)) based on the generated first device unique ID, and transmits the response data to the external device.

The external device receives the response data, and compares the received response data with the expectation value data (H(UC1)) generated on the basis of the first device unique ID (UC1) generated by itself (5).

When the comparison result is in agreement, the external device generates a Hash function (HF2) from the second device unique ID and the encryption key, and transmits the second helper data and the Hash function to the semiconductor integrated circuit (7, 8, 9).

The semiconductor integrated circuit receives the second helper data and the Hash function, generates a second device unique ID on the basis of the received second helper data and the device unique data (10, 2_2), and decrypts the encryption key (HF1) on the basis of the generated second device unique ID and the received Hash function.

According to the above-described configuration, it is possible to set mutually different values to the device unique ID (UC1) for the authentication and the device unique ID (UC2) for the protection of the encryption key; accordingly it is possible to improve the safety.

(9) <Making a Digest of Response>

The semiconductor integrated circuit according to Paragraph 8 is configured as follows in particular.

The semiconductor integrated circuit creates a digest of the reproduced first device unique ID as the response data, with the use of another Hash function different from the Hash function (4_3).

The external device creates a digest of the first device unique ID generated by itself as the expectation value data, with the use of the same Hash function as the another Hash function (4_4), and compares the response data with the expectation value data (5).

According to the above-described configuration, it is possible to protect the device unique ID (UC1) transferred at the time of the authentication; accordingly it is possible to improve the safety further.

(10) <An Encryption Key Encrypted by HF2=Helper Data 2+UC2>

The external device generates encryption key reproducing data ({Enc(HF1), HD2}) by combining and scrambling the Hash function and the second helper data (9), and transmits the encryption key reproducing data to the semiconductor integrated circuit.

The semiconductor integrated circuit receives the encryption key reproducing data, and decrypts the Hash function and the second helper data, by descrambling the encryption key reproducing data received (10).

According to the above-described configuration, it is possible to protect the Hash function (HF1) and the helper data (HD2) which are transferred at the time of writing the key information; accordingly it is possible to improve the safety further.

(11) <A Reader/Writer>

The semiconductor integrated circuit according to one of Paragraph 7 to Paragraph 10 is configured as follows in particular.

The semiconductor integrated circuit is coupled to a reader/writer (22) which communicates with the external device, and performs transmission and reception of data with the external device via the reader/writer.

According to the above-described configuration, it is possible to provide the environment in which the encryption key information can be written in the semiconductor integrated circuit (21), in the stage earlier than the implementation.

(12) <Implementation to a Terminal Device Provided with an Interface with an External Device>

The semiconductor integrated circuit according to one of Paragraph 7 to Paragraph 10 is configured as follows in particular.

The semiconductor integrated circuit is implemented in a terminal device (20) provided with an interface (27) communicating with the external device, and performs transmission and reception of data with the external device via the terminal device.

According to the above-described configuration, it is possible to provide the environment in which the encryption key information can be written in the semiconductor integrated circuit (21) in the state where the semiconductor integrated circuit (21) is implemented in the terminal device (20).

(13) <An Encryption Communications Interface>

The semiconductor integrated circuit according to one of Paragraph 7 to Paragraph 12 is configured as follows in particular.

The semiconductor integrated circuit is further provided with an encryption circuit and a decryption circuit using the decrypted encryption key; and an encryption communications interface (25).

According to the above-described configuration, it is possible to provide the semiconductor integrated circuit which can perform the encryption communications utilizing the encryption key written by the external device.

(14) <Decryption of Encrypted Contents>

The semiconductor integrated circuit according to one of Paragraph 7 to Paragraph 12 is configured as follows in particular.

The semiconductor integrated circuit is further provided with a cipher decrypting circuit (28) using a decrypted encryption key. The semiconductor integrated circuit can access a nonvolatile memory (29) for storing data encrypted using the same encryption key as the encryption key, and can fetch the data stored in the nonvolatile memory to the cipher decrypting circuit.

According to the above-described configuration, it is possible to provide the semiconductor integrated circuit (21) which can change into a usable state (or activate) the encrypted data (contents) stored in the nonvolatile memory (29), by writing the encryption key information in the semiconductor integrated circuit.

(15) <An Encryption Key Management Device (Authentication in Terms of Helper Data)>

An encryption key management device (30) is coupled to a terminal device (20, 21) provided with a unique data generation unit (1) for generating device unique data (UD) defined uniquely by manufacturing variations and an encryption key decrypting unit (6) for decrypting an encryption key (HF1) from encryption key information. The encryption key management device generates the encryption key information on the basis of the device unique data and provides the encryption key information to the terminal device. The encryption key management device is configured as follows.

The terminal device generates the device unique data (UD) by means of the unique data generation unit (1) and provides the device unique data to the encryption key management device.

The encryption key management device receives the device unique data from the terminal device, and generates helper data (HD) and a device unique ID (UC) on the basis of the received device unique data (UD). The device unique ID (UC) is a code defined individually unique to the terminal device, absorbing the generation environment-caused fluctuations of the device unique data (UD) by use of the corresponding helper data (HD). The encryption key management device transmits the helper data to the terminal device.

The terminal device receives the helper data, generates a corresponding device unique ID (UC) on the basis of the received helper data (HD) and the device unique data (UD) (2), generates response data (H(UC)) on the basis of the generated device unique ID (4_1, 4_3), and transmits the response data to the encryption key management device.

The encryption key management device receives the response data, and compares the received response data (H(UC)) with the expectation value data (H(UC)) generated on the basis of the device unique ID generated by itself (4_2, 5).

When the comparison result is in agreement, the encryption key management device generates a Hash function (HF2) from the device unique ID and the encryption key (7) and transmits the Hash function to the terminal device.

The terminal device receives the Hash function and decrypts the encryption key (HF1) on the basis of the device unique ID (UC) generated by itself and the received Hash function (HF2).

According to the above-described configuration, before enabling the utilization of the encryption key in the terminal device (20), it is possible for the encryption key management device (30) to perform authentication with the use of the device unique ID (UC) which is defined individually unique to the terminal device by manufacturing variations; accordingly, it is possible to prevent unjust acquisition of the encryption key.

(16) <Two Sets of a Device Unique ID and Helper Data>

The encryption key management device according to Paragraph 15 is configured as follows in particular.

The encryption key management device generates a first and a second helper data (HD1, HD2) and a first and a second device unique ID (UC1, UC2), on the basis of the received device unique data (UD) (3), and the encryption key management device transmits the first helper data to the terminal device.

The terminal device receives the first helper data, generates a corresponding first device unique ID (UC) on the basis of the received first helper data (HD1) and the device unique data, generates response data (H(UC)) based on the generated first device unique ID (UC), and transmits the response data to the encryption key management device.

The encryption key management device receives the response data, and compares the received response data (H(UC)) with the expectation value data (H(UC)) generated on the basis of the first device unique ID generated by itself (4_2, 5).

When the comparison result is in agreement, the encryption key management device generates a Hash function (HF2) from the second device unique ID and the encryption key (7, 8) and transmits the second helper data and the Hash function to the terminal device.

The terminal device receives the second helper data and the Hash function, generate a second device unique ID (UC2) on the basis of the received second helper data (HD2) and the device unique data (UD), and decrypts the encryption key on the basis of the generated second device unique ID and the received Hash function (6).

According to the above-described configuration, it is possible to set mutually different values to the device unique ID (UC1) for the authentication and the device unique ID (UC2) for the protection of the encryption key; accordingly it is possible to improve the safety.

(17) <Making a Digest of Response>

The encryption key management device according to Paragraph 16 is configured as follows in particular.

The terminal device creates a digest (H(UC1)) of the reproduced first device unique ID (UC1) as the response data, with the use of another Hash function different from the Hash function (4_1).

The encryption key management device creates a digest (H(UC1)) of the first device unique ID (UC) generated by itself as the expectation value data, with the use of the same Hash function as the another Hash function, and compares the response data with the expectation value data ({Enc(HF1), HD2}) (5).

According to the above-described configuration, it is possible to protect the device unique ID (UC1) transferred at the time of the authentication; accordingly it is possible to improve the safety further.

(18) <An Encryption Key Encrypted by HF2=Helper Data 2+UC2>

The encryption key management device according to Paragraph 16 is configured as follows in particular.

The encryption key management device generates encryption key reproducing data by combining and scrambling the Hash function (HF2) and the second helper data (HD2) (9), and transmits the encryption key reproducing data to the terminal device.

The terminal device receives the encryption key reproducing data, and decrypts the Hash function and the second helper data, by descrambling the encryption key reproducing data received (10).

According to the above-described configuration, it is possible to protect the Hash function (HF2) and the helper data (HD2) which are transferred at the time of writing the key information; accordingly it is possible to improve the safety further.

(19) <LSI Provided with a PUF Generation Circuit (Authentication by a Hash Function)>

A semiconductor integrated circuit (21) is provided with a unique data generation unit (1) for generating device unique data (UD) defined uniquely by manufacturing variations and an encryption key decrypting unit (6) for decrypting an encryption key (HF1) by use of encryption key information generated by an external device (30) based on the device unique data and supplied from the external device. The semiconductor integrated circuit (21) is configured as follows.

The semiconductor integrated circuit generates the device unique data (UD) by means of the unique data generation unit and provides the device unique data to the external device.

The external device receives the device unique data from the semiconductor integrated circuit, and generates helper data (HD) and a device unique ID (UC) on the basis of the received device unique data. The device unique ID (UC) is a code defined individually unique to the semiconductor integrated circuit, absorbing the generation environment-caused fluctuations of the device unique data by use of the corresponding helper data (HD).

The external device generates a Hash function (HF2) from the device unique ID and the encryption key, and transmits the Hash function to the semiconductor integrated circuit.

The semiconductor integrated circuit receives the Hash function, generates response data on the basis of the received Hash function (HF2) (4_5), and transmit the response data to the external device.

The external device receives the response data, compares the received response data with the expectation value data generated by itself (5), and when the comparison result is in agreement, the external device transmits the helper data to the semiconductor integrated circuit.

The semiconductor integrated circuit receives the helper data, generates a corresponding device unique ID (UC) on the basis of the received helper data (HD) and the device unique data (UD), and decrypts the encryption key (HF1) on the basis of the generated device unique ID and the received Hash function (6).

According to the above-described configuration, before enabling the utilization of the encryption key in the semiconductor integrated circuit, it is possible to perform authentication with the use of the device unique ID which is defined individually unique to the semiconductor integrated circuit by manufacturing variations; accordingly, it is possible to prevent unjust acquisition of the encryption key.

(20) <An Encryption Key Management Device (Authentication by a Hash Function)>

An encryption key management device (30) is coupled to a terminal device (20, 21) provided with a unique data generation unit (1) for generating device unique data (UD) defined uniquely by manufacturing variations and an encryption key decrypting unit (6) for decrypting an encryption key (HF1) from encryption key information. The encryption key management device generates the encryption key information on the basis of the device unique data and provides the encryption key information to the terminal device, and is configured as follows.

The encryption key management device receives the device unique data (UD) from the terminal device, and generates helper data (HD) and a device unique ID (UC) based on the received device unique data (UD). The device unique ID (UC) is a code defined individually unique to the terminal device, absorbing the generation environment-caused fluctuations of the device unique data (UD) by use of the corresponding helper data (HD).

The encryption key management device generates a Hash function (HF2) from the device unique ID and the encryption key, and transmits the Hash function to the terminal device.

The terminal device receives the Hash function, generates response data on the basis of the received Hash function (HF2), and transmits the response data to the encryption key management device.

The encryption key management device receives the response data, and compares the received response data with the expectation value data generated by itself (5), and when the comparison result is in agreement, the encryption key management device transmits the helper data (HD) to the terminal device.

The terminal device receives the helper data, generates a corresponding device unique ID (UC) on the basis of the received helper data (HD) and the device unique data (UD), and decrypts the encryption key (HF1) on the basis of the generated device unique ID and the received Hash function (6).

According to the above-described configuration, before enabling the utilization of the encryption key in the terminal device (20, 21), it is possible for the encryption key management device (30) to perform authentication with the use of the device unique ID (UC) which is defined individually unique to the terminal device by manufacturing variations; accordingly, it is possible to prevent unjust acquisition of the encryption key.

2. Details of Embodiments

The embodiments are further explained in full detail.

Embodiment 1

<After Authentication by One of Helper Data and a Hash Function, the Other is Provided>

FIG. 1 is a sequence diagram illustrating an encryption key providing method according to Embodiment 1.

The encryption key providing method according to Embodiment 1 provides an encryption key HF1 to a first device (20, 21) which utilizes a cipher, from a second device 30 which manages the encryption key for the cipher. The first device is an MCU 21, for example, and is coupled to an external device 30 which functions as an encryption key management device, such as a server, via a reader/writer 22. It is also preferable that, in place of the MCU 21, an ECU implemented with the MCU 21 is coupled to the external device 30 such as a server, via a reprogramming tool 22 coupled by the OBD-II (On-Board Diagnostics Version II). It is further preferable that the first device is a terminal device 20 implemented with the MCU 21 on board, and is coupled to the external device 30, such as a server, by means of a communication interface provided in the interior or exterior of the MCU 21, via the Internet, LAN (Local Area Network), and other wireless or wired communication lines. It is yet preferable that the first device (20, 21) and the second device 30 are implemented in a single housing, or implemented on the same substrate. In that case, the communication interface and the communication path are implemented very simple, or may be omitted. FIG. 1 illustrates a sequence diagram of communication among the MCU 21, the reader/writer 22, and the encryption key management device 30, as a representative case of these configurations, where time is shown in the vertical direction. What is described above applies equally to FIG. 3, FIG. 5, and FIG. 7 to be described below. Therefore, the explanation thereof will be omitted in Embodiment 2, Embodiment 3, and Embodiment 4.

The first device (for example, MCU) 21 generates device unique data UD defined uniquely by manufacturing variations. It is possible to generate the device unique data UD by utilizing a physically unclonable function (PUF), for example. More specifically, it is possible to define the device unique data UD by the initial value of SRAM at the time of power-on, etc. The device unique data UD has some fluctuations, depending on the environment in which it is generated, such as the temperature of the device and the power supply voltage. This is treated as an error (bit error) included in the device unique data UD.

The second device (an external device such as a server) 30 generates one pair of helper data HD and a device unique ID (UC) based on the device unique data UD. The device unique ID (UC) is a code defined individually unique to the first device 21, absorbing the generation environment-caused fluctuations of the device unique data UD by use of the corresponding helper data HD. It is possible to generate plural sets of the helper data (HD1, HD2) and the device unique ID (UC1, UC2) from one device unique data (UD).

The second device (the external device such as a server) 30 generates a Hash function HF2 from the device unique ID (UC) and the encryption key HF1.

The first device (for example, MCU) 21 decrypts the encryption key HF1 on the basis of the Hash function HF2 and the device unique ID (UC).

The encryption key providing method illustrated in FIG. 1 is a sequence diagram of communication among the MCU 21, the reader/writer 22, and the encryption key management device 30, as a representative case of these configurations, where time is shown in the vertical direction.

The MCU 21 generates the device unique data UD and provides it to the encryption key management device 30 via the reader/writer 22 (the first step). It is assumed that the user authentication between the reader/writer 22 and the encryption key management device 30 has been completed and the session has been activated. Based on the assumption, it is further assumed that the read command of the device unique data UD is issued from the encryption key management device 30 to the MCU 21 via the reader/writer 22. In the communications between the MCU 21 and the encryption key management device 30, the reader/writer 22 intervenes therebetween always. However, the reader/writer 22 does not change data; accordingly, the following explanation omits the description about the intervention of the reader/writer 22.

The encryption key management device 30 generates one pair of the helper data HD and the device unique ID (UC) which are defined individually unique to the MCU 21, on the basis of the device unique data UD provided from the MCU 21 (the second step).

The encryption key management device 30 generates a Hash function HF2 from the generated device unique ID (UC) and the encryption key HF1 (the third step). The Hash function HF2 is generated, for example, by regarding the encryption key HF1 as a message, and performing encryption for it by use of the device unique ID (UC) as an encryption key.

The encryption key management device 30 transmits one of the helper data HD and the Hash function HF2 to the MCU 21 (the fourth step).

The MCU 21 transmits response data to the encryption key management device 30, on the basis of the helper data HD or the Hash function HF2 received at the fourth step (the fifth step). The response data is generated on the basis of the received helper data HD or Hash function HF2. The response data may be in an arbitrary format as far as it can be verified in the encryption key management device 30 as the transmitting source.

The encryption key management device 30 authenticates the MCU 21 by confirming the validity of the response data received at the fifth step (the sixth step). The encryption key management device 30 generates expectation value data for verifying the response data in advance of the authentication (the sixth step), on the basis of the device unique ID (UC) generated at the third step.

After authenticating the MCU 21 at the sixth step, the encryption key management device 30 transmits the other of the helper data HD and the Hash function HF2 to the MCU 21 (the seventh step).

The MCU 21 decrypts the encryption key HF1, on the basis of the device unique data (UD) generated by itself, and the helper data (HD) and the Hash function (HF2) which have been received at the fourth step or the sixth step (the eighth step).

According to the above-described procedure, before enabling the utilization of the encryption key (HF1) in the first device (for example, MCU 21), it is possible to perform authentication with the use of the device unique ID (UC) which is defined individually unique to the first device (for example, MCU 21) by manufacturing variations; accordingly, it is possible to prevent unjust acquisition of the encryption key.

As described already, the following issue has been found: that is, if there is a malicious user, there is a possibility that the injustice of escaping the charging and enabling the utilization of the first device (for example, MCU 21) may be performed, by reporting the false write-in failure to an encryption key management device, in spite of having written the Hash function normally. This is because the charging is performed for the first time when the Hash function is normally written in the first device (for example, MCU 21). On the other hand, in the present embodiment, first, the authentication utilizing the device unique ID (UC) is performed. Therefore, it is possible to perform the charging by regarding the successful authentication as the normal write. When the authentication is unsuccessful, the Hash function HF2 for reproducing the encryption key is not provided. When the Hash function HF2 which is the encryption key information is provided in advance, the helper data HD which is the information for fetching an encryption key from the encryption key information is not provided to prevent the use of the encryption key. It is very rare that the authentication is successful but that the supply of the other of the helper data HD and the Hash function HF2 (the seventh step) is unsuccessful. Such a situation should be dealt with as a device trouble, a communication failure, etc. Even if a malicious user has created such a situation, it is very difficult to utilize the situation for escaping the charging or the like. In this way, it is possible to prevent unjust acquisition of the encryption key.

Embodiment 2

<Authentication by the Helper Data>

Figure 2:
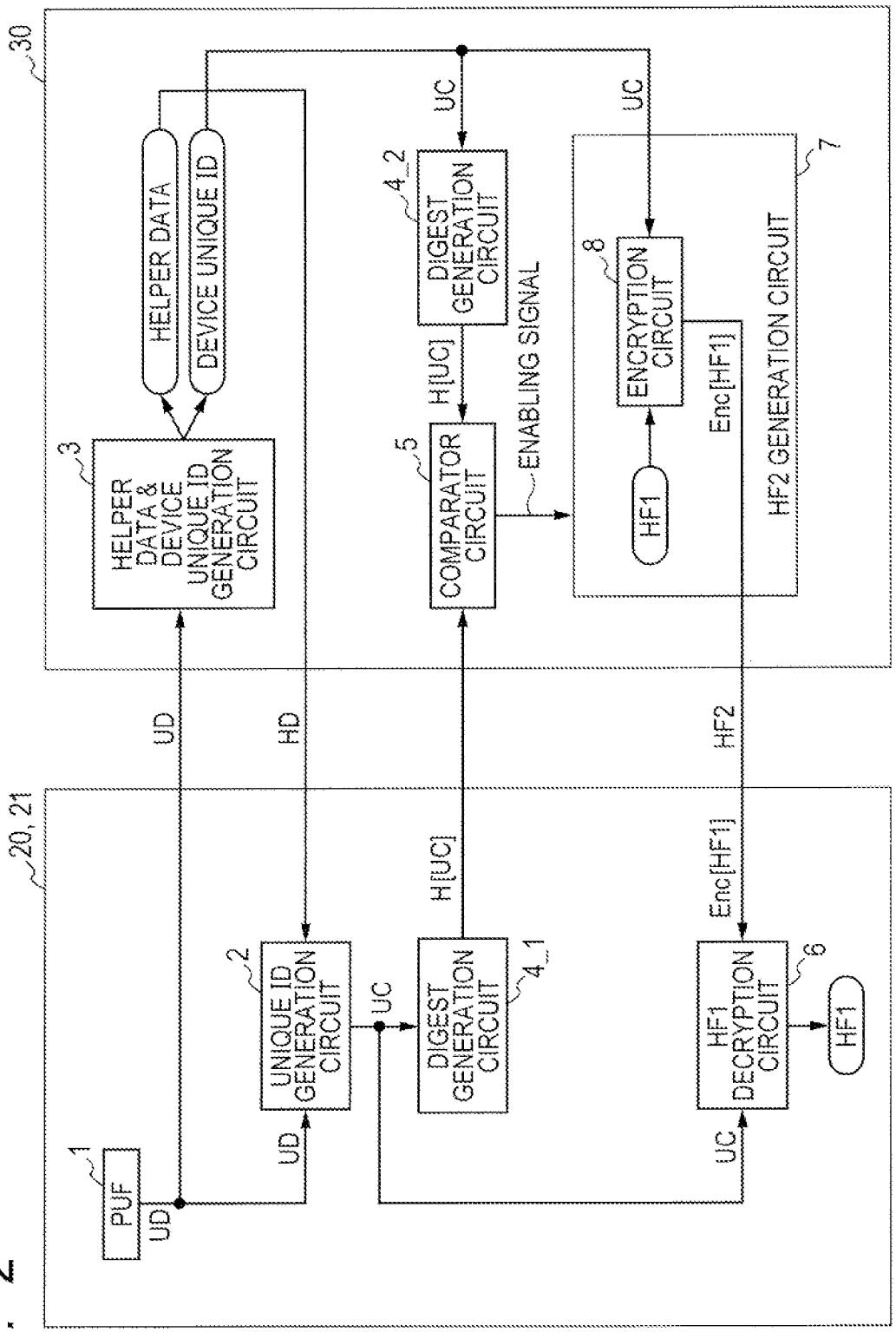
FIG. 2 is a data flow diagram illustrating an encryption key providing system according to Embodiment 2.

FIG. 2 is a data flow diagram illustrating an encryption key providing system according to Embodiment 2. The first device (20, 21) which utilizes a cipher and the second device 30 which manages an encryption key HF1 for the cipher, are coupled with each other. Each block illustrated as a "circuit" may be configured as an independent circuit which has the function of the block, or may be configured as the function realized by software operating in a processor, such as a CPU. The function of plural circuit blocks may be realized by one circuit, or the function of a part of the block illustrated as a circuit block may be realized by another circuit block. In this way, the configuration of the circuit or software to realize the function is arbitrary. As is the case with Embodiment 1 explained above, the first device is the MCU 21, for example, and is coupled to the external device 30, such as a server, which functions as the encryption key management device, via the reader/writer 22. Alternatively, the first device is the terminal device 20 implemented with the MCU 21 on board, and is coupled to the external device (the second device) 30, such as a server, by means of a communication interface provided in the interior or exterior of the MCU 21. Although not restricted in particular, the communication path between the first device (20, 21) and the second device 30 is configured with one system, with communication interfaces provided in respective devices, for example. However, in FIG. 2, the communication interfaces are omitted and separate lines for every data transmission and reception are illustrated. The communication between the first device (20, 21) and the second device 30 is carried out with time-sharing packets, with one communication protocol via the communication interfaces (not shown), for example. What is described above applies equally to FIG. 4 and FIG. 6 to be described below. Therefore, the explanation thereof will be omitted in Embodiment 3 and Embodiment 4.

The first device (20, 21) is configured with a unique data generation unit (PUF) 1, a unique ID generation circuit 2, a digest generation circuit 4_1, and an HF1 decryption circuit 6. The unique data generation unit (PUF) 1 generates the device unique data UD. The device unique data UD includes fluctuations, that is, an error (bit error), caused by the generation environment, as described above. The generated device unique data UD is transmitted to the second device 30 and also provided to the unique ID generation circuit 2. The unique ID generation circuit 2 generates a device unique ID (UC) from the device unique data UD generated by the PUF 1 and the helper data HD provided from the second device 30. Even if fluctuations caused by the generation environment exist in the device unique data UD generated by the PUF 1, they are absorbed by the helper data HD, that is, an error (bit error) is corrected, and it becomes data of high repeatability. The device unique ID (UC) is provided to the digest generation circuit 4_1 and the HF1 decryption circuit 6. The digest generation circuit 4_1 generates a message digest (hereinafter, simply called "digest") H(UC) from the device unique ID (UC) using a prescribed Hash function. The generated digest H(UC) is transmitted to the second device 30. The HF1 decryption circuit 6 decrypts the encrypted encryption key HF1 transmitted from the second device 30, with the use of the device unique ID (UC), and obtains the encryption key HF1.

These circuit blocks may be built in the MCU 21 as independent circuit blocks, respectively, or may be realized as one encryption arithmetic accelerator. Furthermore, these circuit blocks may be realized, in part or in whole, by the function of the software using a CPU (Central Processing Unit), a nonvolatile memory such as a flash memory (registered trademark), SRAM, etc. which are built in the MCU 21. The unique data generation unit (PUF) 1 reads an initial value at the time of power-on of the SRAM utilized as a work area by the CPU, and defines the read initial value as the device unique data UD.

The second device 30 is configured with a generation circuit 3 for generating one pair of the helper data and the device unique ID, a digest generation circuit 4_2, a comparator circuit 5, and an HF2 generation circuit 7. The HF2 generation circuit 7 includes an encryption circuit 8 for encrypting the HF1 as an encryption key. The generation circuit 3 generates one pair of the helper data HD and the device unique ID (UC), on the basis of the device unique data UD provided from the first device (20, 21). To the device unique data UD which includes the generation environment-caused fluctuations, that is, an error (bit error), it is possible to absorb the fluctuations (to correct the error) by use of the helper data HD, and to generate the corresponding device unique ID (UC). An example of the circuit which has the function is the unique ID generation circuit 2 included in the first device (20, 21). The helper data HD generated by the generation circuit 3 is transmitted to the unique ID generation circuit 2 of the first device (20, 21). The device unique ID (UC) generated by the generation circuit 3 is provided to the digest generation circuit 4_2 to generate a digest H(UC). The generated digest H(UC) is sent to the comparator circuit 5, and compared with the digest H(UC) generated by the digest generation circuit 4_1 of the first device (20, 21). The comparator circuit 5 is configured with a CRC (Circular Redundancy Checking) circuit, for example. When two digests are found to be in agreement as the comparison result by the comparator circuit 5, an enabling signal is outputted to the HF2 generation circuit 7. When two digests are confirmed to be in agreement, the HF2 generation circuit 7 sends the encryption key HF1 to the encryption circuit 8, and generates a Hash function HF2 as an encrypted encryption key Enc(HF1), through the encryption with the use of the device unique ID (UC) as an encryption key. The Hash function HF2 is transmitted to the HF1 decryption circuit 6 of the first device (20, 21).

Figure 3:
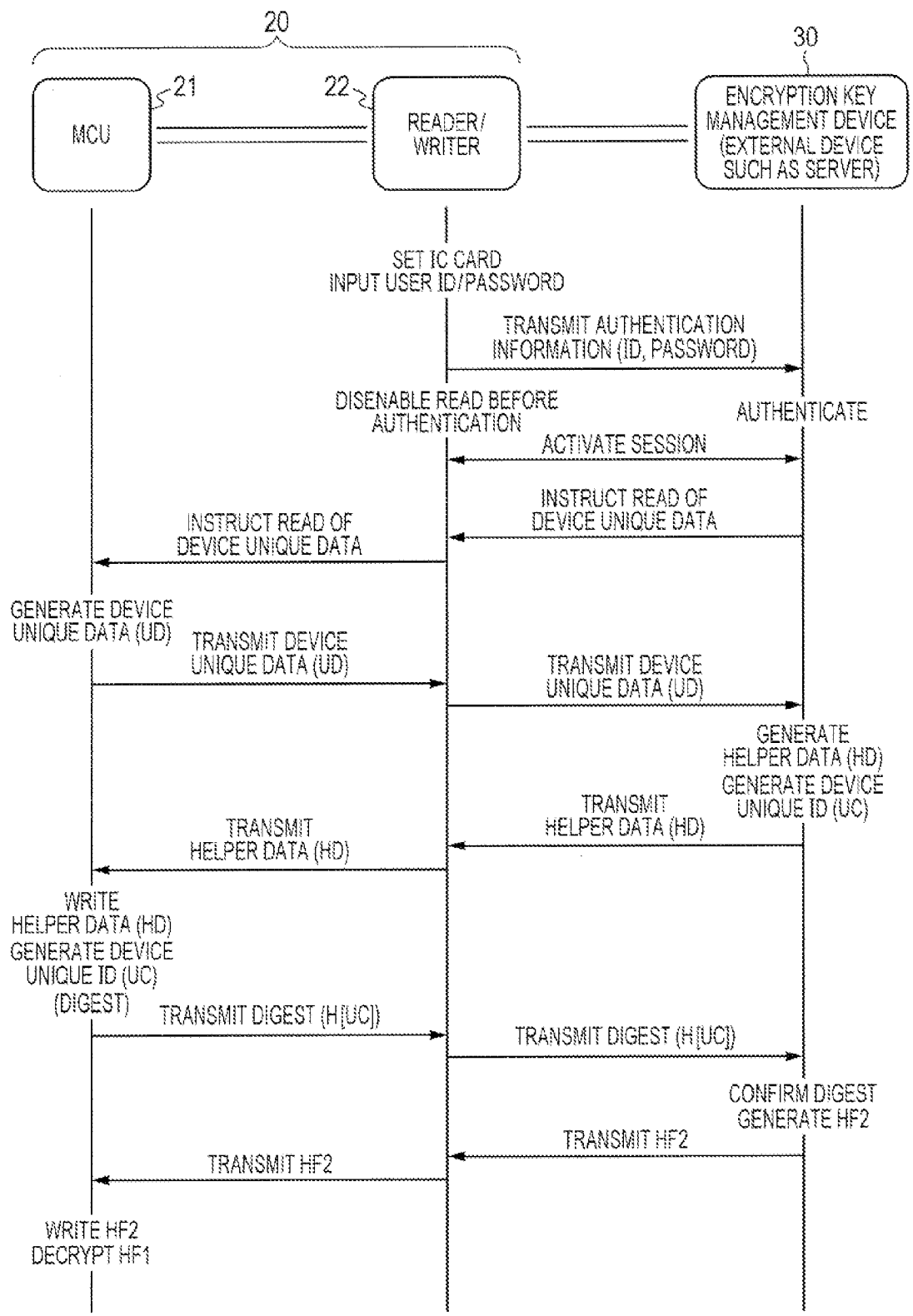
FIG. 3 is a sequence diagram illustrating an encryption key providing method according to Embodiment 2.

FIG. 3 is a sequence diagram illustrating an encryption key providing method according to Embodiment 2.

An operator of the reader/writer 22 sets an IC card and performs user authentication. For example, the operator enters a user ID and a password. Authentication information is transmitted from the reader/writer 22 to the encryption key management device 30. The encryption key management device 30 makes the authentication on the basis of the transmitted authentication information, and the session is activated when the operator is authenticated as a valid user. Until then, the access from the reader/writer 22 to the MCU 21, for example, a read of a memory and a register in the MCU 21, is forbidden.

When the session is activated, the encryption key management device 30 issues a device unique data read command to the MCU 21 via the reader/writer 22. In response, the MCU 21 generates device unique data (UD) and transmits it to the encryption key management device 30 via the reader/writer 22. Hereafter, communication between the MCU 21 and the encryption key management device 30 is all performed via the reader/writer 22. However, the following explanation is made omitting the phrase "via the reader/writer 22." The encryption key management device 30 generates one pair of helper data HD and a device unique ID (UC) from the transmitted device unique data (UD). The encryption key management device 30 transmits only the helper data HD to the MCU 21 first. The MCU 21 writes the transmitted helper data HD into a nonvolatile memory, etc., and generates a device unique ID (UC) from the helper data HD and the device unique data UD generated in the MCU 21. The error (bit error) included in the device unique data UD is corrected, and the device unique ID (UC) of high repeatability is generated. The generated device unique ID (UC) is made into a digest, and is transmitted to the encryption key management device 30 as the message digest H(UC). The encryption key management device 30 generates in advance the digest H(UC) as an expectation value data for verifying the response data, on the basis of the device unique ID (UC) generated earlier. The encryption key management device 30 confirms that the transmitted digest H(UC) and the digest H(UC) internally generated by itself is in agreement. When in agreement, the encryption key management device 30 generates a Hash function HF2, and transmits it to the MCU 21. The MCU 21 writes the transmitted Hash function HF2 into the nonvolatile memory. After this moment, the MCU 21 is allowed to decrypt and to use the encryption key HF1. According to the above-described procedure, the supply of the encryption key from the encryption key management device 30 to the MCU 21 is completed.

In order for the MCU 21 to utilize the encryption key HF1, both the helper data HD and the Hash function HF2 are necessary. This is because the device unique ID (UC) is necessary, in order to obtain HF1 by decrypting the Hash function HF2, and because it is necessary to absorb the fluctuations present in the internally generated device unique data UD by use of the helper data HD, in order to obtain the device unique ID (UC). As already explained, if both the helper data HD and the Hash function HF2 are transmitted at the same time, there arises the defect in security in which the unjust act for escaping charging to the write of an encryption key will be allowed. For example, when a user of the MCU 21 and an operator of the reader/writer 22 are malicious ones, if both the helper data HD and the Hash function HF2 are transmitted at the same time, it becomes possible to escape the charging to the write of the encryption key, by reporting the false write-in failure to the encryption key management device 30, in spite of the fact that it becomes possible to utilize the encryption key HF1 in the MCU 21 from that time. On the other hand, according to the encryption key providing method illustrated in FIG. 3, it is possible to solve the present problem. Out of the helper data HD and the Hash function HF2, which are two parameters necessary for the MCU 21 to utilize the encryption key HF1, only the helper data HD is first written in the MCU 21. After confirming, in terms of the digest H(UC), that the MCU 21 can generate a proper device unique ID (UC) with the use of the provided helper data HD, the Hash function HF2, which is the other parameter, is transmitted. The confirmation of the digest H(UC) functions as the authentication for proving the genuine MCU 21. The digest H(UC) corresponds to the reply of response data in the authentication. Even if the system is configured such as to reply the device unique ID (UC) as it is, the problem is solved theoretically. However, there arises another defect in security that the device unique ID (UC) is revealed by other attacks. It is possible to improve the safety further by replying with the digest of the device unique ID (UC), instead of replying the device unique ID (UC) as it is.

<An Encryption Key Providing System Applied to an Electrical System of a Vehicle>

Figure 8:
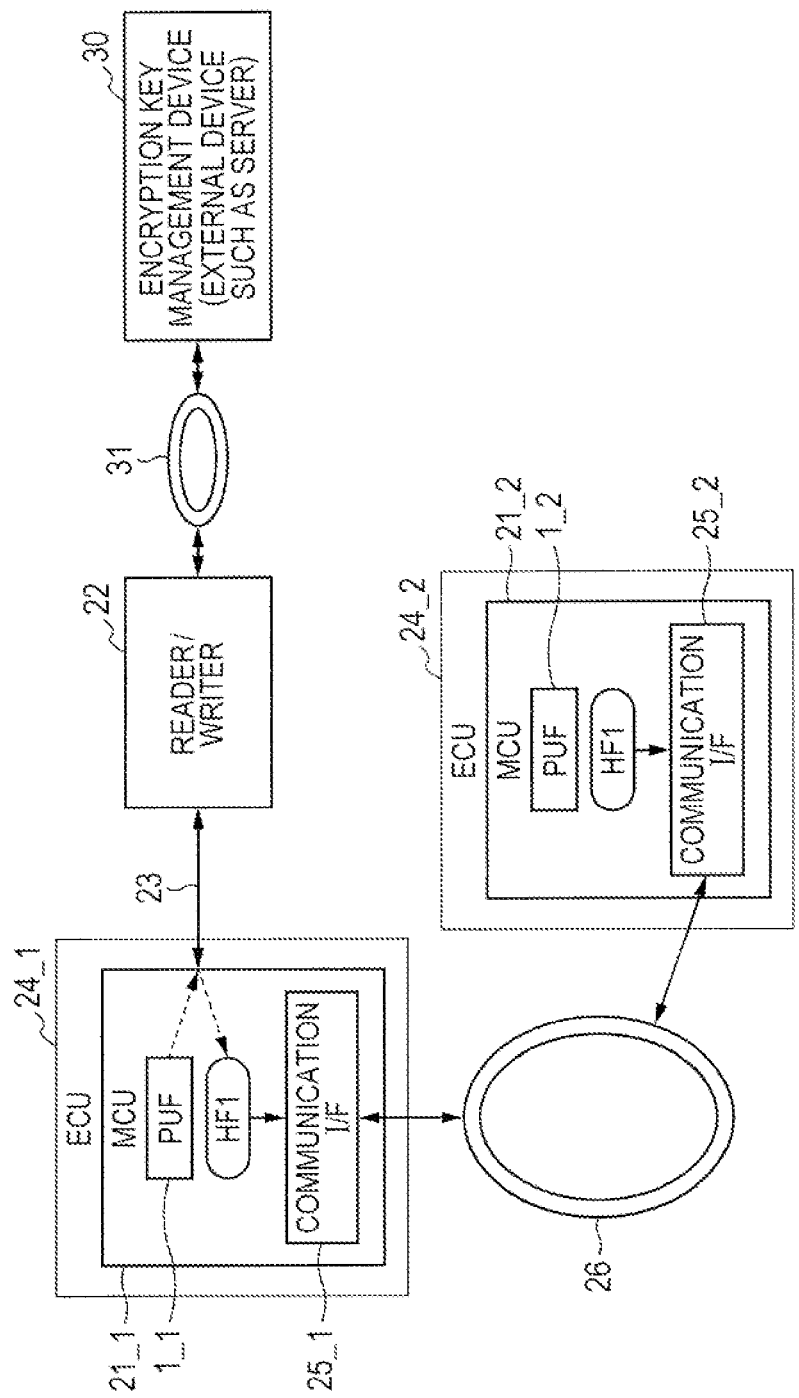
FIG. 8 is a data flow diagram illustrating an encryption key providing system applied to an electrical system of a vehicle.

FIG. 8 is a data flow diagram illustrating an encryption key providing system applied to an electrical system of a vehicle.

An ECU 24_1 in which an MCU 21_1 according to the present embodiment is mounted, and an ECU 24_2 in which another MCU 21_2 is mounted are coupled via an in-vehicle LAN (Local Area Network) 26. The in-vehicle LAN 26 is a CAN (Controller Area Network) and a FlexRay, for example, to which plural ECUs are coupled, and they communicate with each other. In FIG. 8, only two ECUs 24_1 and 24_2 are illustrated for simplicity. Even if it is the in-vehicle LAN 26, there is a possibility that it may be subjected to the attack of hacking, etc. For example, the case of an attack which took over the CAN and controlled a brake and a light from the exterior are reported in recent years. In order to improve safety by providing resistance properties for such an attack, the encrypted communication is adopted. The MCU 21_1 and the MCU 21_2 are respectively provided with built-in communication interfaces 25_1 and 25_2 which perform encryption and decryption of message using an encryption key HF1. The ECU 24_1 is an ECU of a door of the vehicle and the ECU 24_2 is an ECU of a console panel. When the door is exchanged, in order to enable encryption communication between the console panel and the door again, it is necessary to write the same encryption key HF1 into the ECU 24_1 of the exchanged door. The above-described exchange of the door may be performed in a repair shop of low security environments, compared with an automotive manufacturing plant, a dealer, etc. Accordingly, it is dangerous to provide the encryption key HF1 which is an encryption key of a high secrecy, without encrypting. Therefore, the reader/writer 22 is coupled to the MCU 21_1 and the encryption key is written from the encryption key management device 30. The MCU 21_1 and the reader/writer 22 is coupled with a connecting cable 23 based on the OBD-II, for example. The encryption key management device 30 is an external device such as a server, and is installed in secure environments, and is accessed by the reader/writer 22 via a network 31 such as the Internet.

The MCU 21_1 is configured with a unique data generation unit (PUF) 1_1, and the encryption key HF1 is written by the encryption key providing method explained in the above-described embodiment. The authentication of the MCU is performed using the device unique data UD generated by the unique data generation unit (PUF) 1_1 and the encryption key providing method according to the embodiment is applied. Accordingly, it is possible to write the encryption key HF1 safely, even if an operator of the reader/writer 22, etc. is a malicious user. An MCU mounted in other ECUs, for example the MCU 21_2, can be configured similarly.

Not only Embodiment 2 but all of other Embodiments 1, 3, and 4 can be applied to the encryption key providing system applied to the electrical system of the vehicle illustrated in FIG. 8.

<The Encryption Key Providing System Applied to a Network Terminal>

Figure 9:
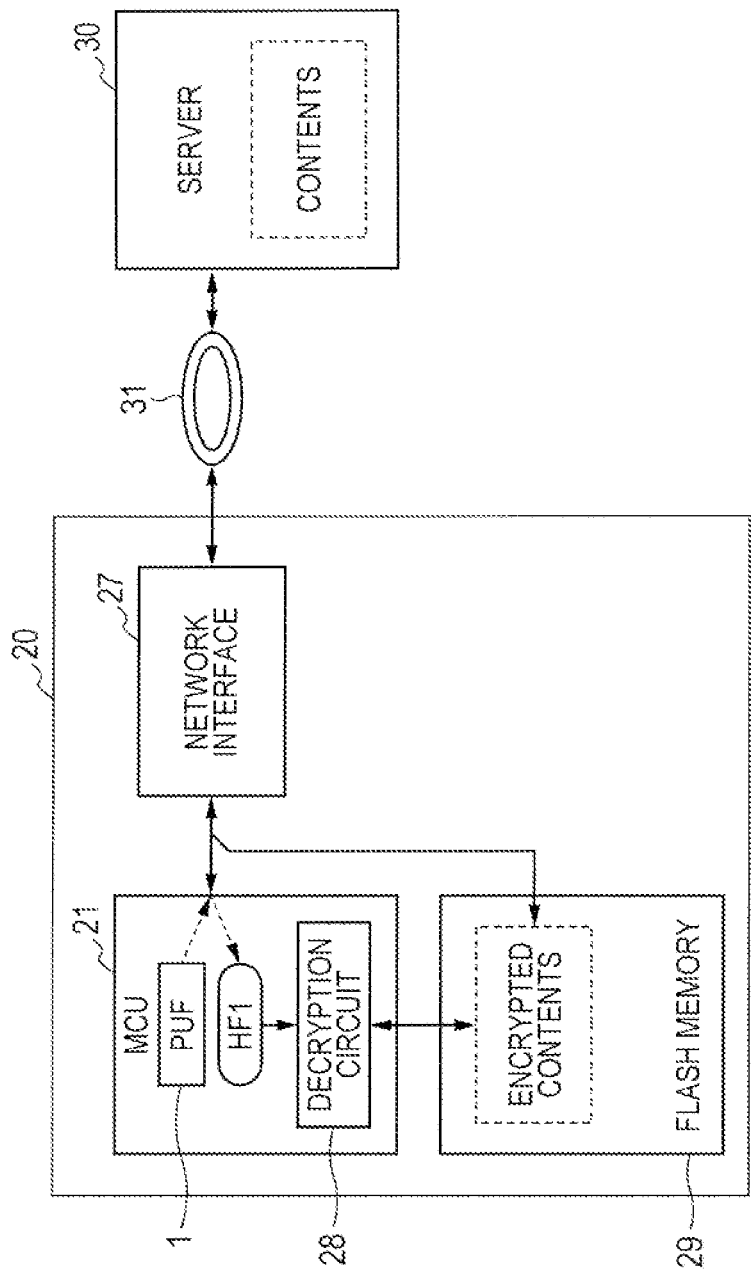
FIG. 9 is a data flow diagram illustrating an encryption key providing system applied to a network terminal.

FIG. 9 is a data flow diagram illustrating an encryption key providing system applied to a network terminal.

A network terminal 20 illustrated in FIG. 9 is coupled to a content server 30 via a network 31 such as the Internet. The network terminal 20 is configured with an MCU 21, a network interface 27, and a flash memory 29. The MCU 21 is configured with a unique data generation unit (PUF) 1 and a decryption circuit 28 for decrypting the cipher by an encryption key HF1. The device unique data UD generated by the PUF 1 is put on a packet in the network 31 via the network interface 27, and is transmitted to the server 30. The server 30 provides the encryption key HF1 to the MCU 21 as is the case with the encryption key providing method described above. The contents encrypted with the use of the encryption key HF1 is stored in the flash memory 29. The MCU 21 decrypts the cipher by means of the decryption circuit 28 and utilizes the contents concerned.

The network terminal 20 is an electronic dictionary, for example, and when a user purchases new contents, the present embodiment is applied to enhance the safety. The user who is going to purchase new contents downloads the contents from the content server 30 via the network 31, and stores them in the own flash memory 29. Contents may be provided by package media, etc., not through the network. Since the contents are encrypted with the use of the encryption key HF1, the user cannot utilize the contents until the encryption key HF1 is obtained. When the user indicates the purchase intention of the contents concerned to the content server 30, in response to the intention, the content server 30 reads the device unique data UD from the MCU 21, and provides the encryption key HF1 to the MCU 21, as is the case with the encryption key providing method described above. The user can utilize the contents concerned only after the encryption key HF1 is written in the MCU 21.

As described above, the authentication of the MCU 21 is performed with the use of the device unique data UD generated by the unique data generation unit (PUF) 1. Therefore, it is possible to write the encryption key HF1 safely.

Not only Embodiment 2 but all of other Embodiments 1, 3, and 4 can be applied to the encryption key providing system applied to the network terminal illustrated in FIG. 9.

Embodiment 3

<Two Sets of a Device Unique ID and Helper Data>

Figure 4:
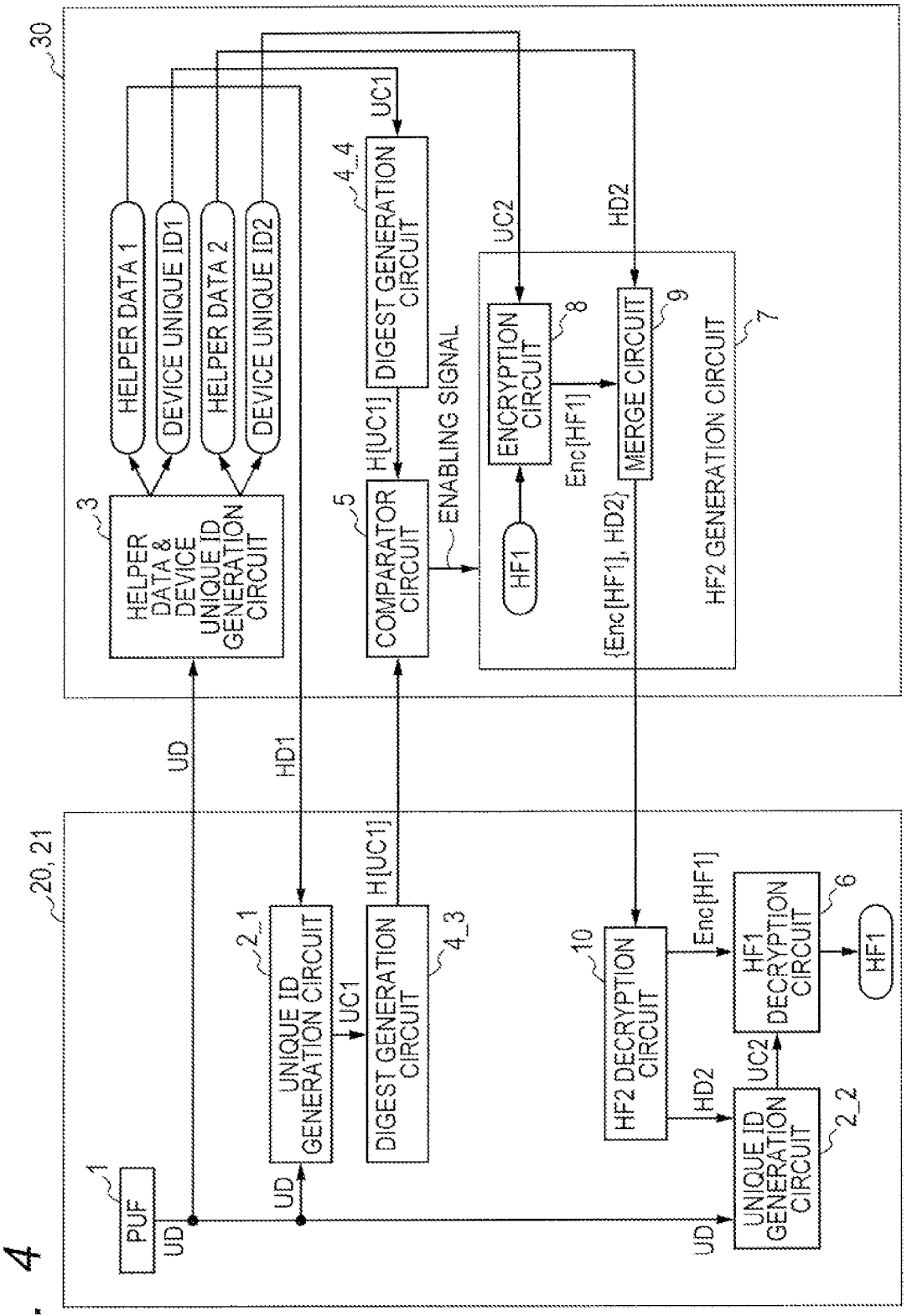
FIG. 4 is a data flow diagram illustrating an encryption key providing system according to Embodiment 3.

FIG. 4 is a data flow diagram illustrating an encryption key providing system according to Embodiment 3.

The difference from the encryption key providing system according to Embodiment 2 illustrated in FIG. 2 lies in the point that the first device (20, 21) is provided with two unique ID generation circuits 2_1, 2_2, and an HF2 decryption circuit 10. The difference lies also in the point that in the second device 30, the helper data & device unique ID generation circuit 3 generates two sets of helper data HD1 and a device unique ID-1 (UC1) and helper data HD2 and a device unique ID-2 (UC2), and that the HF2 generation circuit 7 is further provided with a merge circuit 9. The helper data HD1 corresponds to the device unique ID-1 (UC1), and the helper data HD2 corresponds to the device unique ID-2 (UC2). To one piece of device unique data UD generated by the unique data generation unit (PUF) 1, the device unique ID-1 (UC1) can be generated when the helper data HD1 is used, and the device unique ID-2 (UC2) can be generated when the helper data HD2 is used. The unique ID generation circuits 2_1 and 2_2 have the function described above, respectively. The helper data HD1 and the helper data HD2, and the device unique ID-1 (UC1) and the device unique ID-2 (UC2) have different values, respectively. The merge circuit 9 included in the HF2 generation circuit 7 is a circuit which combines the encrypted HF1 (Enc(HF1)) and the helper data HD2, and performs prescribed scrambling. The HF2 decryption circuit 10 is a circuit which performs the opposite processing (descrambling) and separates the encrypted HF1 (Enc(HF1)) and the helper data HD2. The other parts of the configuration are same as those of Embodiment 2; accordingly the explanation thereof is omitted.

Figure 5:
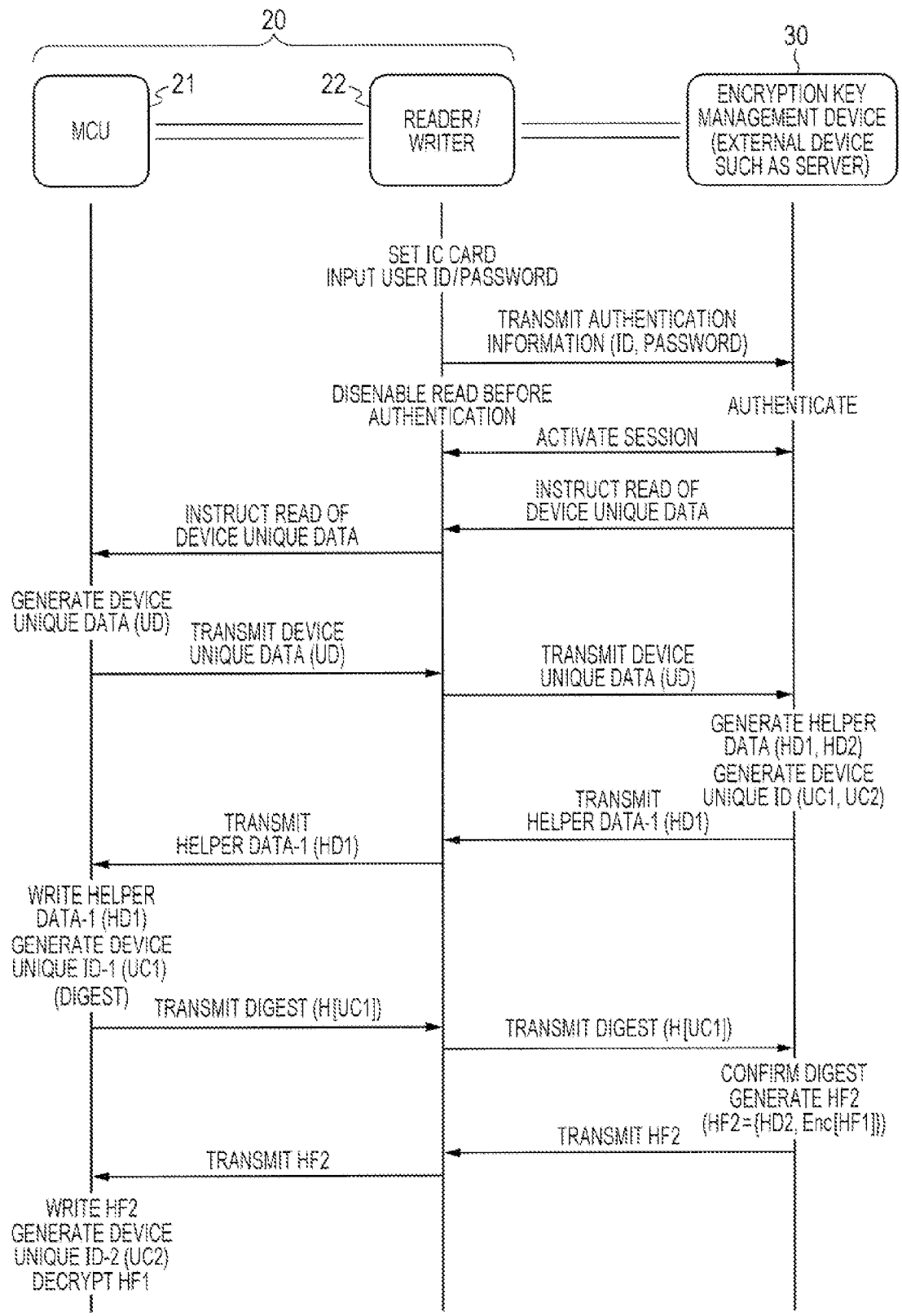
FIG. 5 is a sequence diagram illustrating an encryption key providing method according to Embodiment 3.

FIG. 5 is a sequence diagram illustrating an encryption key providing method according to Embodiment 3.

The sequence from the user authentication and the session activation until the MCU 21 generates the device unique data (UD) and transmits it to the encryption key management device 30 via the reader/writer 22, in response to the device unique data read command from the encryption key management device 30, is the same as that of Embodiment 2 explained with reference to FIG. 3.

With the use of the device unique data (UD) transmitted, the encryption key management device 30 generates two pairs of the helper data and the device unique ID, that is, one pair of the mutually corresponding helper data HD1 and device unique ID-1 (UC1), and the other pair of the mutually corresponding helper data HD2 and device unique ID-2 (UC2). The encryption key management device 30 transmits only the helper data HD1 to the MCU 21 first. The MCU 21 writes the transmitted helper data HD1 into a nonvolatile memory, etc., and generates a device unique ID-1 (UC1) from the helper data HD1 and the device unique data UD generated in the MCU 21. The generated device unique ID-1 (UC1) is made into a digest by the digest generation circuit 4_3, and is transmitted to the encryption key management device 30 as the message digest H(UC1). The encryption key management device 30 generates in advance the digest H(UC1) as an expectation value data for verifying the response data, on the basis of the device unique ID-1 (UC1) generated earlier. The encryption key management device 30 confirms that the transmitted digest H(UC1) and the digest H(UC1) internally generated by itself are in agreement. When in agreement, the encryption key management device 30 generates a Hash function HF2, and transmits it to the MCU 21. The Hash function HF2 is the data that the encrypted HF1 (Enc(HF1)) with the use of the device unique ID-2 (UC2) and the helper data HD2 have been combined and have undergone the prescribed scrambling. The MCU 21 stores the transmitted Hash function HF2 into the nonvolatile memory. By means of the HF2 decryption circuit 10, the MCU 21 separates the Hash function HF2 into the encrypted HF1 (Enc(HF1)) and the helper data HD2. The helper data HD2 is inputted into the unique ID generation circuit 2_2, and the unique ID generation circuit 2_2 generates the device unique ID-2 (UC2) from the device unique data (UD). With the use of the generated device unique ID-2 (UC2), the HF1 decryption circuit 6 decrypts the encrypted HF1 (Enc(HF1)) to obtain the encryption key HF1. After this moment, the MCU 21 is allowed to decrypt and to use the encryption key HF1. According to the above-described procedure, the supply of the encryption key from the encryption key management device 30 to the MCU 21 is completed.

Also in the present embodiment, as is the case with Embodiment 2, out of the helper data HD and the Hash function HF2, which are two parameters necessary for the MCU 21 to utilize the encryption key HF1, only the helper data HD is first transmitted to the MCU 21 to authenticate the MCU 21, and after the authentication, the Hash function HF2 as the other parameter is transmitted. According to the above-described procedure, it is possible to prevent unjust acquisition of the encryption key.

Furthermore, the device unique ID-1 (UC1) for the authentication and the device unique ID-2 (UC2) for encrypting the encryption key HF1 are separated, accordingly it is possible to improve the safety further.

Embodiment 4

<Authentication by a Hash Function>

In Embodiment 2 and Embodiment 3, out of the helper data HD and the Hash function HF2, which are two parameters necessary for the MCU 21 to utilize the encryption key HF1, only the helper data HD is first transmitted to the MCU 21 to authenticate the MCU 21, and after the authentication, the Hash function HF2 as the other parameter is transmitted. In the present Embodiment 4, conversely, the Hash function HF2 including the information on the encryption key HF1 in the encrypted state is first written in the MCU 21, and after the authentication, the helper data HD as the other parameter is transmitted. According to the present procedure, it is similarly possible to prevent unjust acquisition of the encryption key.

Figure 6:
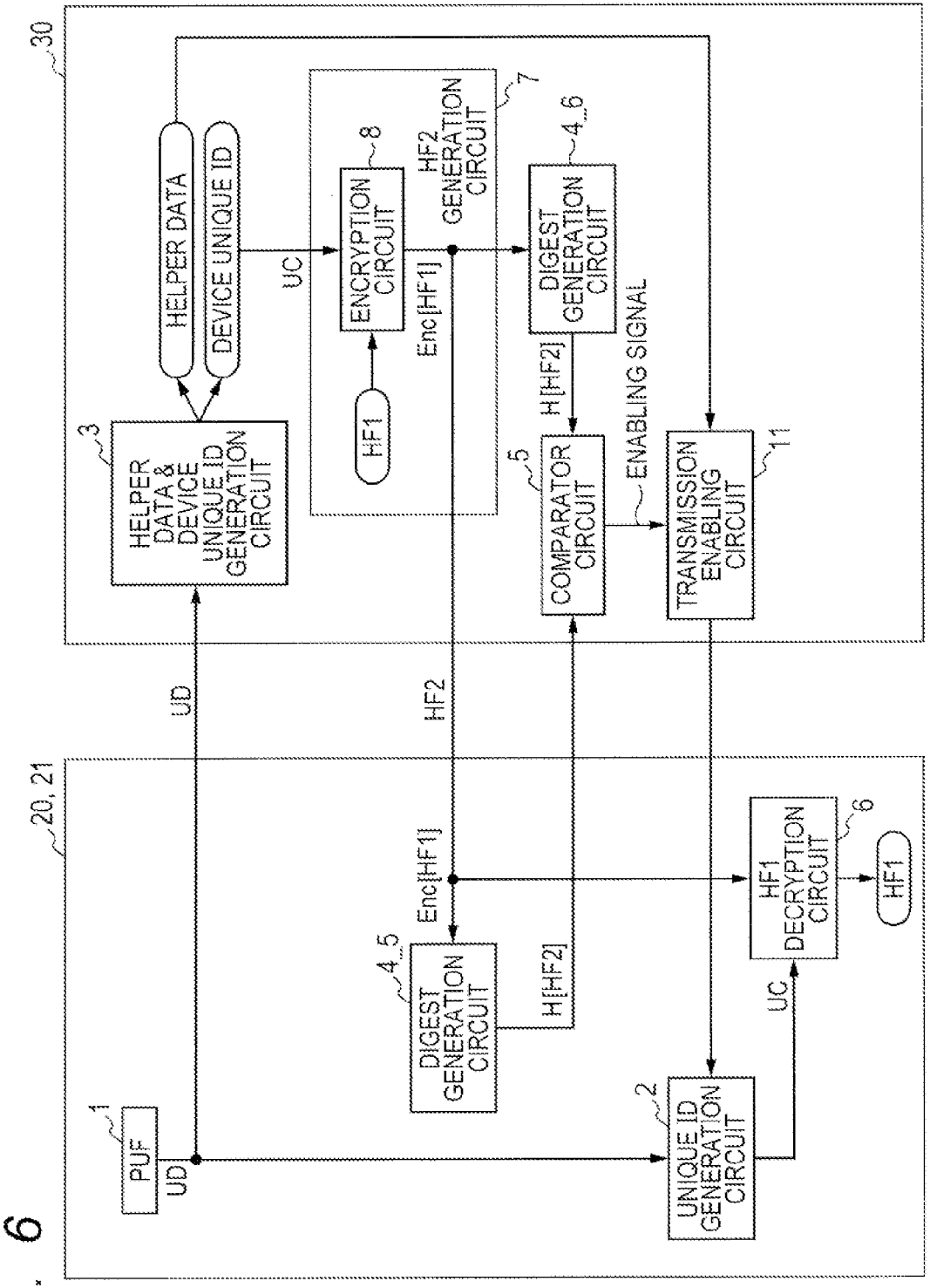
FIG. 6 is a data flow diagram illustrating an encryption key providing system according to Embodiment 4.

FIG. 6 is a data flow diagram illustrating an encryption key providing system according to Embodiment 4.

The first device (20, 21) is configured with a unique data generation unit (PUF) 1, a unique ID generation circuit 2, a digest generation circuit 4_5, and an HF1 decryption circuit 6. The device unique data UD generated by the PUF 1 is transmitted to the helper data & device unique ID generation circuit 3 (generating one pair of the helper data and the device unique ID) of the second device 30, and provided to the unique ID generation circuit 2 of the first device (20, 21). The digest generation circuit 4_5 generates a message digest H(HF2) to the Hash function HF2 transmitted from the second device 30, with the use of a prescribed Hash function. The generated digest H(HF2) is transmitted to the comparator circuit 5 of the second device 30. The unique ID generation circuit 2 generates a device unique ID (UC) from the device unique data UD generated by the PUF 1 and from the helper data HD provided from the second device 30. The HF1 decryption circuit 6 decrypts the encrypted encryption key HF1 as the Hash function HF2, transmitted from the second device 30, with the use of the device unique ID (UC), and obtains the encryption key HF1.

The second device 30 is configured with a generation circuit 3 for generating one pair of the helper data and the device unique ID, an HF2 generation circuit 7, a digest generation circuit 4_6, a comparator circuit 5, and a transmission enabling circuit 11. The generation circuit 3 generates one pair of the helper data HD and the device unique ID (UC), on the basis of the device unique data UD provided from the first device (20, 21). The device unique ID (UC) generated in the generation circuit 3 is outputted to the HF2 generation circuit 7, and the Hash function HF2 as the encrypted encryption key Enc(HF1) is generated. The Hash function HF2 is transmitted to the first device (20, 21), and the message digest H(HF2) is generated as the response data by means of the digest generation circuit 4_5. The Hash function HF2 generated in the second device 30 is provided to the digest generation circuit 4_6 to generate the digest H(HF2). The generated digest H(HF2) is sent to the comparator circuit 5, and is compared with the digest H(HF2) generated as the response data of the first device (20, 21). When two digests are found to be in agreement as the comparison result by the comparator circuit 5, an enabling signal is outputted to the transmission enabling circuit 11. When the agreement of two digests is confirmed, the transmission enabling circuit 11 transmits the helper data HD to the unique ID generation circuit 2 of the first device (20, 21). In this way, even if the authentication is performed by transmitting the HF2 first, it becomes possible to secure the same degree of security as in Embodiments 2 and 3.

Figure 7:
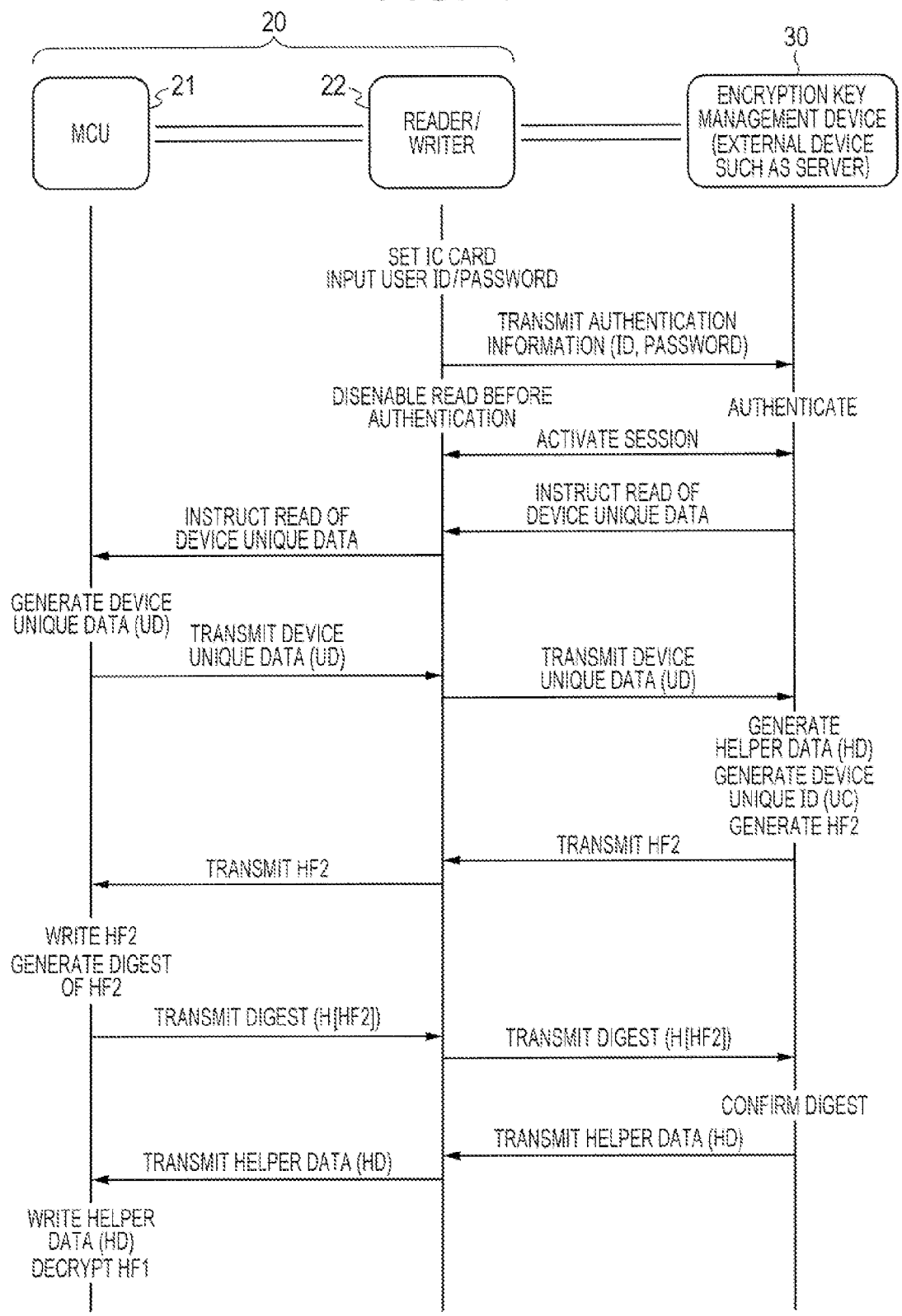
FIG. 7 is a sequence diagram illustrating an encryption key providing method according to Embodiment 4.

FIG. 7 is a sequence diagram illustrating an encryption key providing method according to Embodiment 4.

The sequence from the user authentication and the session activation until the MCU 21 generates the device unique data (UD) and transmits it to the encryption key management device 30 via the reader/writer 22, in response to the device unique data read command from the encryption key management device 30, is the same as that of Embodiment 2 explained with reference to FIG. 3.

The encryption key management device 30 generates one pair of helper data HD and a device unique ID (UC) from the transmitted device unique data (UD). Furthermore, the encryption key management device 30 generates the Hash function HF2, and transmits it to the MCU 21. The MCU 21 writes the transmitted Hash function HF2 into the nonvolatile memory. The MCU 21 generates a message digest H(HF2) from the transmitted Hash function HF2 by means of the digest generation circuit 4_5, and responds to the encryption key management device 30. The encryption key management device 30 confirms the digest by comparing the digest H(HF2) as the response data with the digest H(HF2) generated by itself by means of the digest generation circuit 4_6. When the agreement of the digests is confirmed, the helper data HD is transmitted from the encryption key management device 30 to the MCU 21. The MCU 21 writes the helper data HD into a nonvolatile memory. The unique ID generation circuit 2 of the MCU 21 generates the device unique ID (UC) from the present helper data HD and the device unique data UD generated internally. The generated device unique ID (UC) is inputted into the HF1 decryption circuit 6. The Hash function HF2 is already inputted into the HF1 decryption circuit 6. Accordingly, the HF1 decryption circuit 6 can obtain the encryption key by decrypting the Hash function HF2 with the use of the inputted device unique ID (UC).

After this moment, the MCU 21 is allowed to decrypt and to use the encryption key HF1. According to the above-described procedure, the supply of the encryption key from the encryption key management device 30 to the MCU 21 is completed.

As described above, in the present embodiment, out of the helper data HD and the Hash function HF2, which are two parameters necessary for the MCU 21 to utilize the encryption key HF1, only the Hash function HF2 is written in the MCU 21. Differing from Embodiments 2 and 3, the MCU 21 in the present embodiment generates a digest H(HF2) as the response data from the Hash function HF2, and transmits it as the response to the encryption key management device 30. After confirming the agreement of this digest H(HF2), the encryption key management device 30 transmits the helper data HD as the other parameter. The confirmation of the digest H(HF2) functions as the authentication for proving the genuine MCU 21. Since the MCU 21 is allowed to utilize the encryption key HF1 only after the helper data HD is transmitted, it is possible to prevent unjust acquisition of the encryption key.

As described above, the invention accomplished by the present inventors has been concretely explained based on the embodiments. However, it cannot be overemphasized that the present invention is not restricted to the embodiments, and it can be changed variously in the range which does not deviate from the gist.

For example, the first device (20, 21) and the second device 30 may be realized by any kind of embodiment in concrete form. It is preferable that the MCU 21 incorporates the surrounding functions and is formed by single chip. Alternatively, it is also preferable that the MCU 21 is incorporated in a part of a circuit for realizing another function.

What is claimed is:

1. An encryption key providing method for providing an encryption key to a first device utilizing a cipher from a second device managing the encryption key for the cipher,
wherein the first device generates device unique data defined uniquely by manufacturing variations,
wherein the second device generates one pair of helper data and a device unique ID based on the device unique data, the device unique ID being a code defined individually unique to the first device, absorbing the generation environment-caused fluctuations of the device unique data by use of the corresponding helper data,
wherein the second device generates a Hash function from the device unique ID and the encryption key,
wherein the first device decrypts the encryption key based on the Hash function and the device unique ID, and
wherein the encryption key providing method comprises:
a first step at which the first device generates the device unique data and provides it to the second device;
a second step at which the second device generates one pair of helper data and a device unique ID defined uniquely to the first device, on the basis of the device unique data provided;
a third step at which the second device generates a Hash function from the device unique ID generated and the encryption key;
a fourth step at which one of the helper data and the Hash function is transmitted from the second device to the first device;
a fifth step at which the first device transmits response data to the second device based on the one of the helper data and the Hash function received at the fourth step;

a sixth step at which the second device authenticates the first device by confirming the validity of the response data received at the fifth step;

a seventh step at which the second device transmits the other of the helper data and the Hash function to the first device after authenticating the first device at the sixth step; and an eighth step at which the first device decrypts the encryption key, based on the device unique data generated by itself and the helper data and the Hash function received at the fourth step or the sixth step.

2. The encryption key providing method according to claim 1, wherein at the fourth step, the second device transmits the helper data to the first device, wherein at the fifth step, the first device reproduces the device unique ID from the received helper data, creates the response data based on the reproduced device unique ID, and transmits the response data to the second device, wherein at the sixth step, the second device confirms the validity of the response data, by comparing the response data with the expectation value data based on the device unique ID generated at the second step, and wherein at the seventh step, the second device transmits the Hash function to the first device, after authenticating the first device at the sixth step.

3. The encryption key providing method according to claim 2, wherein at the second step, on the basis of the provided device unique data, the second device generates a first device unique ID defined uniquely to the first device and first helper data for generating the first device unique ID, and a second device unique ID different from the first device unique ID and second helper data for generating the second device unique ID, wherein at the third step, the second device generates a Hash function from the second device unique ID and the encryption key, wherein at the fourth step, the second device transmits the first helper data to the first device, wherein at the fifth step, the first device reproduces the first device unique ID from the received first helper data, creates the response data based on the reproduced first device unique ID, and transmits the response data to the second device, wherein at the sixth step, the second device confirms the validity of the response data, by comparing the response data with the expectation value data based on the first device unique ID generated at the second step, wherein at the seventh step, the second device transmits further the second helper data to the first device, after authenticating the first device at the sixth step, and wherein at the eighth step, the first device generates the second device unique ID based on the device unique data generated by itself, and the second helper data received at the seventh step, and decrypts the encryption key on the basis of the reproduced second device unique ID and the Hash function received at the seventh step.

4. The encryption key providing method according to claim 3, wherein at the fifth step, the first device creates a digest of the reproduced first device unique ID as the response data, with the use of another Hash function different from the Hash function, and wherein at the sixth step, the second device creates a digest of the first device unique ID generated at the second step as the expectation value data, with the use of the same Hash function as the another Hash function, and confirms the validity of the response data by comparing the response data with the expectation value data.

5. The encryption key providing method according to claim 3, wherein at the seventh step, the second device combines and scrambles the Hash function and the second helper data, and transmits the scrambled data to the first device, and wherein at the eighth step, the first device decrypts the Hash function and the second helper data by descrambling the scrambled data.

6. The encryption key providing method according to claim 1, wherein at the fourth step, the second device transmits the Hash function to the first device, wherein at the fifth step, the first device creates the response data based on the received Hash function, and transmits the response data to the second device, wherein at the sixth step, the second device confirms the validity of the response data, by comparing the response data with the expectation value data based on the Hash function generated at the third step, and wherein at the seventh step, the second device transmits the helper data to the first device, after authenticating the first device at the sixth step.

7. A semiconductor integrated circuit comprising:

a unique data generation unit operable to generate device unique data defined uniquely by manufacturing variations; and an encryption key decrypting unit operable to decrypt an encryption key by use of encryption key information generated by an external device based on the device unique data and supplied from the external device, wherein the semiconductor integrated circuit generates the device unique data by means of the unique data generation unit and provides it to the external device, wherein the external device receives the device unique data from the semiconductor integrated circuit, and generates helper data and a device unique ID on the basis of the received device unique data, the device unique ID being a code defined individually unique to the semiconductor integrated circuit, absorbing the generation environment-caused fluctuations of the device unique data by use of the corresponding helper data, and the external device transmits the helper data to the semiconductor integrated circuit, wherein the semiconductor integrated circuit receives the helper data, generates a corresponding device unique ID on the basis of the received helper data and the device unique data, generates response data based on the generated device unique ID, and transmits the response data to the external device, wherein the external device receives the response data, and compares the received response data with the expectation value data generated on the basis of the device unique ID generated by itself, wherein, when the comparison result is in agreement, the external device generates a Hash function from the device unique ID and the encryption key and transmits the Hash function to the semiconductor integrated circuit, and wherein the semiconductor integrated circuit receives the Hash function and decrypts the encryption key on the basis of the device unique ID generated by itself and the received Hash function.

8. The semiconductor integrated circuit according to claim 7,
wherein the external device generates a first and a second helper data and a first and a second device unique ID, on the basis of the received device unique data, and the external device transmits the first helper data to the semiconductor integrated circuit,
wherein the semiconductor integrated circuit receives the first helper data, generates a corresponding first device unique ID on the basis of the received first helper data and the device unique data, generates response data based on the generated first device unique ID, and transmits the response data to the external device,
wherein the external device receives the response data, and compares the received response data with the expectation value data generated on the basis of the first device unique ID generated by itself,
wherein, when the comparison result is in agreement, the external device generates a Hash function from the second device unique ID and the encryption key and transmits the second helper data and the Hash function to the semiconductor integrated circuit, and
wherein the semiconductor integrated circuit receives the second helper data and the Hash function, generates a second device unique ID on the basis of the received second helper data and the device unique data, and decrypts the encryption key on the basis of the generated second device unique ID and the received Hash function.

9. The semiconductor integrated circuit according to claim 8,
wherein the semiconductor integrated circuit creates a digest of the reproduced first device unique ID as the response data, with the use of another Hash function different from the Hash function, and
wherein the external device creates a digest of the first device unique ID generated by itself as the expectation value data, with the use of the same Hash function as the another Hash function, and compares the response data with the expectation value data.

10. The semiconductor integrated circuit according to claim 8,
wherein the external device generates encryption key reproducing data by combining and scrambling the Hash function and the second helper data, and transmits the encryption key reproducing data to the semiconductor integrated circuit, and
wherein the semiconductor integrated circuit receives the encryption key reproducing data, and decrypts the Hash function and the second helper data, by descrambling the encryption key reproducing data received.

11. The semiconductor integrated circuit according to claim 7,
wherein the semiconductor integrated circuit is coupled to a reader/writer capable of communicating with the external device, and performs transmission and reception of data with the external device via the reader/writer.

12. The semiconductor integrated circuit according to claim 7,
wherein the semiconductor integrated circuit is implemented in a terminal device provided with an interface capable of communicating with the external device, and performs transmission and reception of data with the external device via the terminal device.

13. The semiconductor integrated circuit according to claim 7 further comprising:
an encryption circuit and a decryption circuit using the decrypted encryption key; and
an encryption communications interface.

14. The semiconductor integrated circuit according to claim 7 further comprising:
a cipher decrypting circuit using the decrypted encryption key,
wherein the semiconductor integrated circuit accesses a nonvolatile memory for storing data encrypted using the same encryption key as the encryption key, and fetches the data stored in the nonvolatile memory to the cipher decrypting circuit.

15. An encryption key management device coupled to a terminal device comprising: a unique data generation unit for generating device unique data defined uniquely by manufacturing variations; and an encryption key decrypting unit for decrypting an encryption key from encryption key information, the encryption key management device being operable to generate the encryption key information on the basis of the device unique data and to provide the encryption key information to the terminal device,
wherein the terminal device generates the device unique data by means of the unique data generation unit and provides the device unique data to the encryption key management device,
wherein the encryption key management device receives the device unique data from the terminal device, and generates helper data and a device unique ID on the basis of the received device unique data, the device unique ID being a code defined individually unique to the terminal device, absorbing the generation environment-caused fluctuations of the device unique data by use of the corresponding helper data, and the encryption key management device transmits the helper data to the terminal device,
wherein the terminal device receives the helper data, generates a corresponding device unique ID on the basis of the received helper data and the device unique data, generates response data based on the generated device unique ID, and transmits the response data to the encryption key management device,
wherein the encryption key management device receives the response data and compares the received response data with the expectation value data generated on the basis of the device unique ID generated by itself,
wherein, when the comparison result is in agreement, the encryption key management device generates a Hash function from the device unique ID and the encryption key and transmits the Hash function to the terminal device, and
wherein the terminal device receives the Hash function and decrypts the encryption key on the basis of the device unique ID generated by itself and the received Hash function.

16. The encryption key management device according to claim 15,
wherein the encryption key management device generates a first and a second helper data and a first and a second device unique ID, on the basis of the received device unique data, and the encryption key management device transmits the first helper data to the terminal device,
wherein the terminal device receives the first helper data, generates a corresponding first device unique ID on the basis of the received first helper data and the device unique data, generates response data on the basis of the generated first device unique ID, and transmits the response data to the encryption key management device,
wherein the encryption key management device receives the response data, and compares the received response data with the expectation value data generated on the basis of the first device unique ID generated by itself, wherein, when the comparison result is in agreement, the encryption key management device generates a Hash function from the second device unique ID and the encryption key and transmits the second helper data and the Hash function to the terminal device, and wherein the terminal device receives the second helper data and the Hash function and generates a second device unique ID on the basis of the received second helper data and the device unique data, and decrypts the encryption key on the basis of the second device unique ID generated by itself and the received Hash function.

17. The encryption key management device according to claim 16, wherein the terminal device creates a digest of the reproduced first device unique ID as the response data, with the use of another Hash function different from the Hash function, and wherein the encryption key management device creates a digest of the first device unique ID generated by itself as the expectation value data, with the use of the same Hash function as the another Hash function, and compares the response data with the expectation value data.

18. The encryption key management device according to claim 16, wherein the encryption key management device generates encryption key reproducing data by combining and scrambling the Hash function and the second helper data, and transmits the encryption key reproducing data to the terminal device, and wherein the terminal device receives the encryption key reproducing data, and decrypts the Hash function and the second helper data, by descrambling the encryption key reproducing data received.

* * * * *